Aug. 31, 1965        N. ANHANGER ETAL        3,203,037
MACHINE FOR PORTIONED EXTRUDING OF CHOPPED
MEAT, OR OF A SIMILAR PLASTIC MASS
Filed May 6, 1963
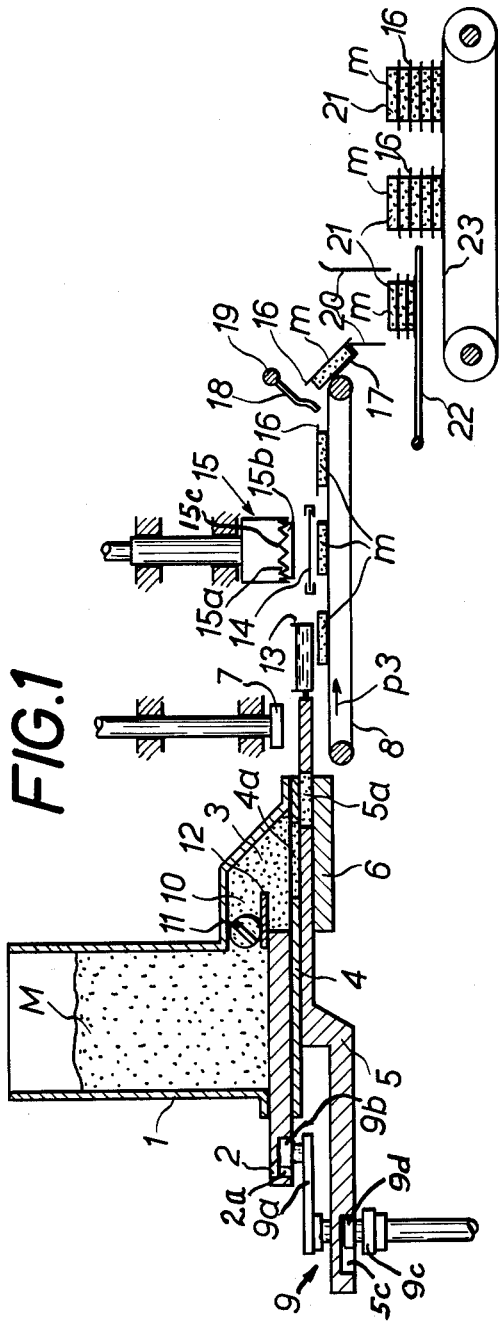
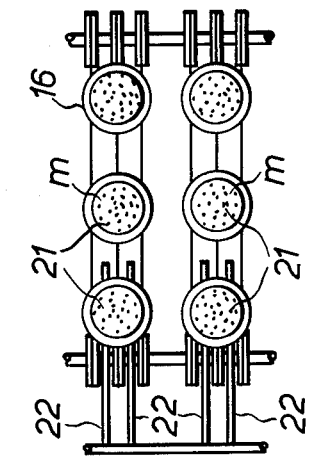
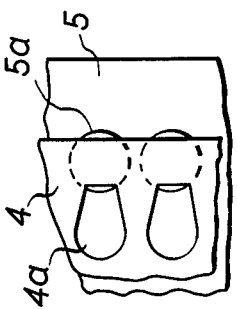
INVENTORS
NORVALD ANHANGER
ODD ANHANGER
BY  Irwin S. Thompson
ATTORNEY

United States Patent Office 3,203,037
Patented Aug. 31, 1965

3,203,037
MACHINE FOR PORTIONED EXTRUDING OF CHOPPED MEAT, OR OF A SIMILAR PLASTIC MASS
Norvald Anhanger and Odd Anhanger, both of Arbeidergt 2, Trondheim, Norway
Filed May 6, 1963, Ser. No. 278,361
Claims priority, application Denmark, Feb. 28, 1963, 934/63
3 Claims. (Cl. 17—32)

For automatic extruding and shaping of measured portions of a mass of meat—which in the following description are called blanks or bits—it is known to make use of a machine which comprises the following main members:

(1) a supply hopper for the raw material;
(2) in said hopper a bottom plate forming a reciprocable plate-like piston;
(3) a pressure chamber situated in front of the hopper;
(4) in said pressure chamber a bottom plate which at the same time provides a guide for the piston plate, and is provided with apertures through which meat mass may be extruded;
(5) a reciprocable slide arranged below the bottom plate of the pressure chamber, having openings for the formation of the bits;
(6) a plate, situated below the slide, which controls the reciprocating motion;
(7) a number of extrusion pistons arranged in front of the pressure chamber for extrusion of the bits which have been pressed into the cavities of the slides, and
(8) a conveyor band running in front of the pressure chamber and below the extrusion pistons.

Such a machine operates in the following manner:

The meat mass coming from the supply hopper is, by means of the reciprocable piston plate that forms the bottom plate of the hopper, pressed into the pressure chamber situated in front of the piston plate. From said pressure chamber the mass is pressed through the apertures of the bottom plate and is received in the cavities of the reciprocable slide below the pressure chamber, from which cavities the bits received are extruded by means of said pistons, and are deposited upon the conveyor band.

The object of the present invention is to provide the following improvements in such a machine.

A.—Entirely automatic operation

It was found that in practice there is unavoidably introduced into the pressure chamber an excess of meat mass, viz. more than can become extruded through the holes of the bottom plate of the pressure chamber into the cavities in the slide, in which cavities the extruded bits are shaped. The excess of meat mass thus must be removed from the pressure chamber. In the hitherto known machines of this type such removal was effected in that the plate situated below the slide was provided with apertures, through which the excess of meat mass was pressed out and collected in containers which, when filled, have their contents returned into the supply hopper. Said known machines accordingly demand an extra operation step for collecting and returning the excess of meat mass, and thus the operation is not entirely automatic. The object of the invention is to avoid this drawback.

According to the invention this aim is realized by the special feature that the topmost part of the pressure chamber communicates with a channel (return channel) that opens into the supply hopper above the piston plate. Thereby is rendered unnecessary the collecting of the excess of meat mass, since said meat mass is automatically pressed upwards through the return channel and from this into the supply hopper.

Further, according to the invention, there may be in the supply channel be inserted a slide valve controlling the cross sectional area of the channel, which feature affords a simple and effective possibility of controlling the pressure within the pressure chamber.

According to the invention the return channel may be realized by the arrangement of a partition plate, which at the same time forms a guide for the piston plate at the top side thereof. The openings in the slide situated below the bottom plate, serving to shape the blanks or bits, normally are of cylindrical shape, and in order to obtain even and complete filling of such openings during the reciprocating movements of the piston plate and of the slide, it was found desirable to give the openings in the bottom plate of the pressure chamber a special shape.

B.—Moistening mechanism.

In order to avoid adherance of the meat mass to the extrusion pistons it has, in practice, been found essential to take care that the under-surfaces of the pistons are moistened between each stroke of operation. This is, according to the invention, achieved by means of a moistening mechanism.

C.—Application of paper, and stacking

A further improvement of the machine described above consists in the provision of a mechanism for automatic placing of paper upon the extruded bits, and for stacking of such paper-coated bits, so that there is formed a stack in which the several bits are separated by means of intermediately placed layers of paper.

The construction and operation of the special features defined in the claims are below explained with reference to the drawing, in which:

FIG. 1 diagrammatically and partly in section discloses a side view of an embodiment of a machine according to the invention, FIG. 2 shows part of the bottom face of the pressure chamber, as seen from above, and FIG. 3 is a top view of the stacking mechanism of the machine.

The main constituents of the machine are designated by reference numerals, 1–8.

The supply hopper 1, which contains a plastic mass, e.g. a meat mass M, is provided with a bottom plate 2 forming a plate-shaped piston, which may be displaced sideways into and out of a pressure chamber 3, which is situated in front of the hopper 1 by means of a driving mechanism consisting of a crank arm 9a having a peg 9b engaging a guiding groove 2a in the bottom of the plate 2. The plate piston 2 is adapted to slide upon a plate 4, which forms a bottom plate of the pressure chamber 3 and is provided with apertures 4a, through which the mass compressed within the pressure chamber 3 becomes, during the forward movement of the plate piston, pressed down into and received in shaping openings 5a, provided in a slide 5, which is situated below the bottom plate 4 and which may be reciprocated by means of driving mechanism 9, which includes an upright shaft rotated by a conventional motor (not shown) whereby the plate 2 and the slide 5 are reciprocated in alternation with each other. After the pressure chamber 3 are placed extrusion pistons 7, of which only one is shown in the drawing, the numbers of which correspond to the apertures in the slide 5, which pistons, at the end positions of the slide, outside of the area of the pressure chamber, drive the bits *m* formed within the apertures downwards onto a conveyor belt 8.

According to the invention the top portion of the pressure chamber 3 communicates with a bypass conduit or return channel 10, which opens into the supply hopper, above the pressure chamber 3. At the junction of the channel 10 and the hopper 1 is provided a control valve 11 for control of the cross sectional area of the channel 10 and thus of the pressure within the pressure chamber. The channel 10 is formed so that in the chamber 3 there is provided a partition plate 12, which forms a guide for the pressure piston 2.

The shaping apertures 5a of the slide 5 are circular in shape, as shown on FIG. 2, whereas the apertures 4a in the bottom plate 4 of the pressure chamber have elongated shape, whereby it is insured that the shaping apertures become completely filled with meat mass during the relative movements of the slide and the piston plate.

In the embodiment shown the extrusion pistons 7 are combined with a moistening device. Adjacent to each piston a water-container 13 is connected to the slide 5. The upwards and downwards movements of the pistons are synchronized with the reciprocating movements of the slide in such a manner that the movements of the pistons have twice the frequency of the slide. Thus said water-container 13 is moved below the piston 7 at every second piston stroke, whereby the piston becomes moistened by being dipped into the water at each operative stroke. The bits extruded from the shaping apertures 5a, by means of the pistons 7, fall down onto the conveyor belt 8 which is moved stepwise in the direction indicated by the arrow p3.

In the embodiment shown the machine is adapted to deliver the blanks or bits $m$ as stacks of suitable height, which stacks may be directly wrapped and shipped. This requires, however, that between each of said blanks or bits a disc of paper is inserted, and this is effected by means of the combined paper-applying mechanism and the stacking mechanism shown at the right part of FIGURE 1 and which consists of the following parts:

(a) A number of pistons 15, of which only one is shown in the drawing, are arranged above the conveyor belt 8 and adapted to punch out a paper disc 16 and to press said disc downwards, upon the top face of a bit $m$ situated below the piston. Said pistons 15 consist each of a cylindrical mantle 15a provided with a cutting edge 15c and of a piston 15b displaceable relative to the mantle, which will press the punched paper disc 16 downwards onto the bit or blank $m$.

(b) A paper web 14 is movably arranged between the piston 15 and the conveyor belt 8, transversely to the latter, from which web the discs 16 are punched by means of the cutting edge 15c.

(c) At the end of the conveyor belt 8, below the plane thereof, are provided a number of stationary supporting members 17, of which only one is shown in the drawing, in the form of a trough or rack or shelf adapted to collect blanks or bits $m$ falling down from the end of the conveyor belt 8 and to temporarily hold such bits in an oblique position. Said supporting members may consist of fingers formed from folded-over metal wire.

(d) Above the gripping members 17 are provided a number of driving members 18, of which only one is shown in the drawing, rotatable on a horizontal shaft 19, which members catch the obliquely positioned paper-covered bits at the top edges thereof and tip them over the edges of the supporting members.

(e) Below the latter are provided funnel-formed guide members 20, which guide the bits falling downwards, so that said bits become stacked upon a carrier surface 22.

(f) Said surface, upon which are stacked the bits in the form of stacks 21, consists of a number of spaced rods 22, which are displaceable in vertical direction, so that the entire surface with the stacks 21 thereon may be lowered onto a conveyor belt.

(g) Said belt consists of a number of parallel bands 23, provided at such relative distances therebetween that the rods 22 may be lowered through the spaces between the conveyor belts 23, whereby the stacks 21 are transferred from the rods 22 to the conveyor belt 23.

We claim:
1. Apparatus for forming meat patties and the like from a mass of comminuted meat or similar plastic material, comprising a supply hopper, means for removing material from the hopper and for shaping the removed material and for discharging the shaped material, said means including slide means having at least one aperture therein for receiving and shaping material in one reciprocated position and for discharging shaped material in another reciprocated position, piston means reciprocable normal to the path of said slide means in said another position of the slide means to discharge shaped material from said at least one aperture, a water container reciprocable below said piston means, and means moving the slide means and the piston means and the water container in such synchronism that the piston means moves into the water container and said at least one aperture in alternation.

2. Apparatus as claimed in claim 1, in which said water container is mounted for reciprocation with said slide means.

3. Apparatus for forming meat patties or the like from a mass of comminuted meat or similar plastic material, comprising a supply hopper, means defining a pressure chamber communicating with the hopper to receive material from the hopper, reciprocable piston means for forcing material from the hopper into the pressure chamber, reciprocable slide means having at least one aperture therein for receiving and shaping material from the piston chamber in one reciprocated position and for discharging shaped material in another reciprocated position, means defining a bypass conduit between the pressure chamber and the hopper for returning excess material from the pressure chamber to the hopper, further piston means reciprocable normal to the path of said slide means in said another position of the slide means to discharge shaped material from said at least one aperture, a water container reciprocable below said further piston means, and means moving the slide means and the further piston means and the water container in such synchronism that the further piston means moves into the water container and said at least one aperture in alternation.

References Cited by the Examiner

UNITED STATES PATENTS

| 1,651,378 | 12/27 | De Lucia et al. | 17—32 |
| 1,882,143 | 10/32 | Henry | 31—9 |
| 2,338,939 | 1/44 | Holly | 17—32 |
| 2,666,229 | 1/54 | Vogt | 31—8 X |
| 2,825,192 | 3/58 | Brodsky | 31—24 X |
| 3,137,029 | 6/64 | De Zolt | 17—32 |

FOREIGN PATENTS

| 284,576 | 6/15 | Germany. |
| 293,638 | 8/16 | Germany. |

SAMUEL KOREN, *Primary Examiner.*

LUCIE H. LAUDENSLAGER, *Examiner.*